June 15, 1926.  
W. ROBERTS  
WRAPPING MACHINE  
Filed May 6, 1924  
1,589,229  
13 Sheets-Sheet 5

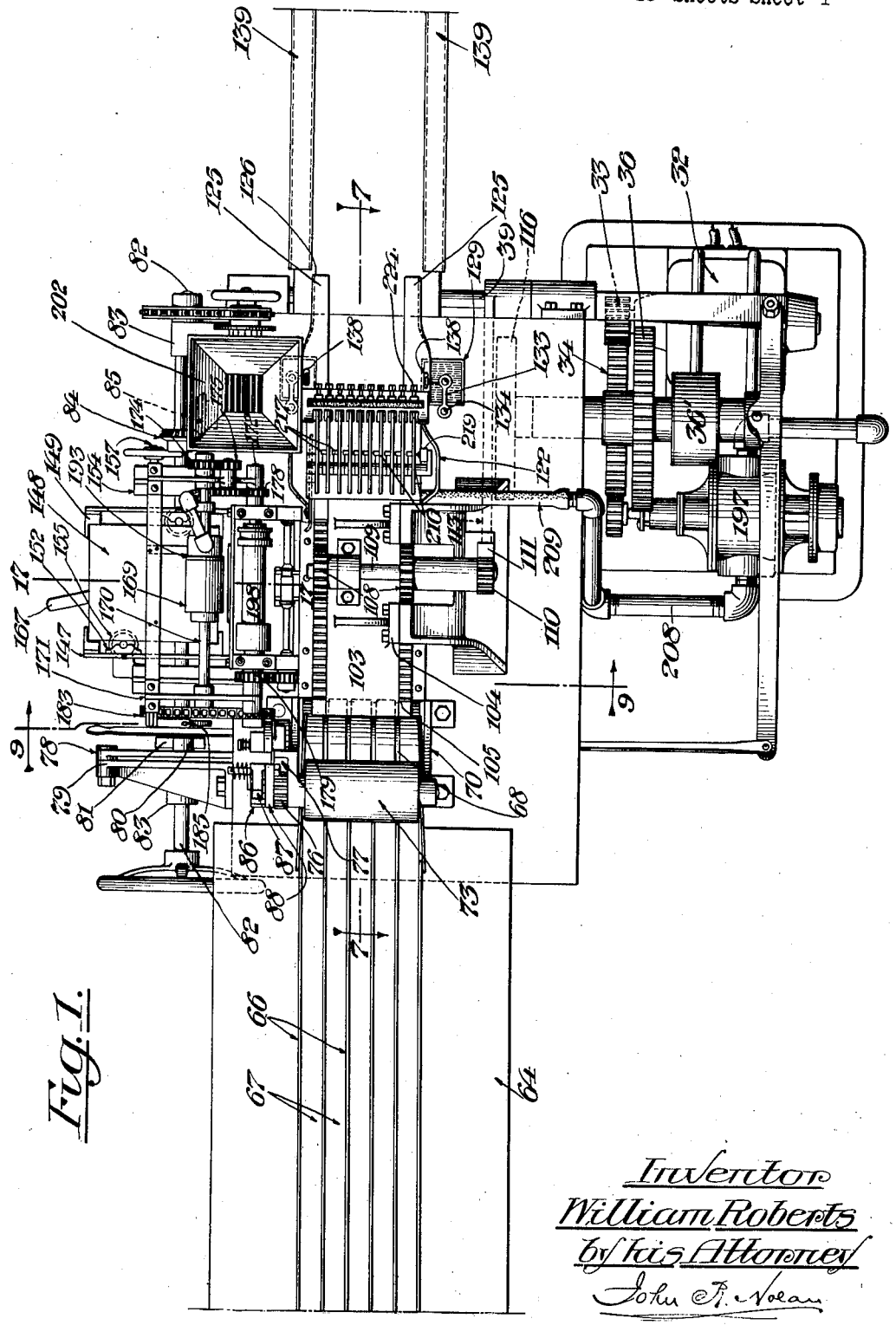

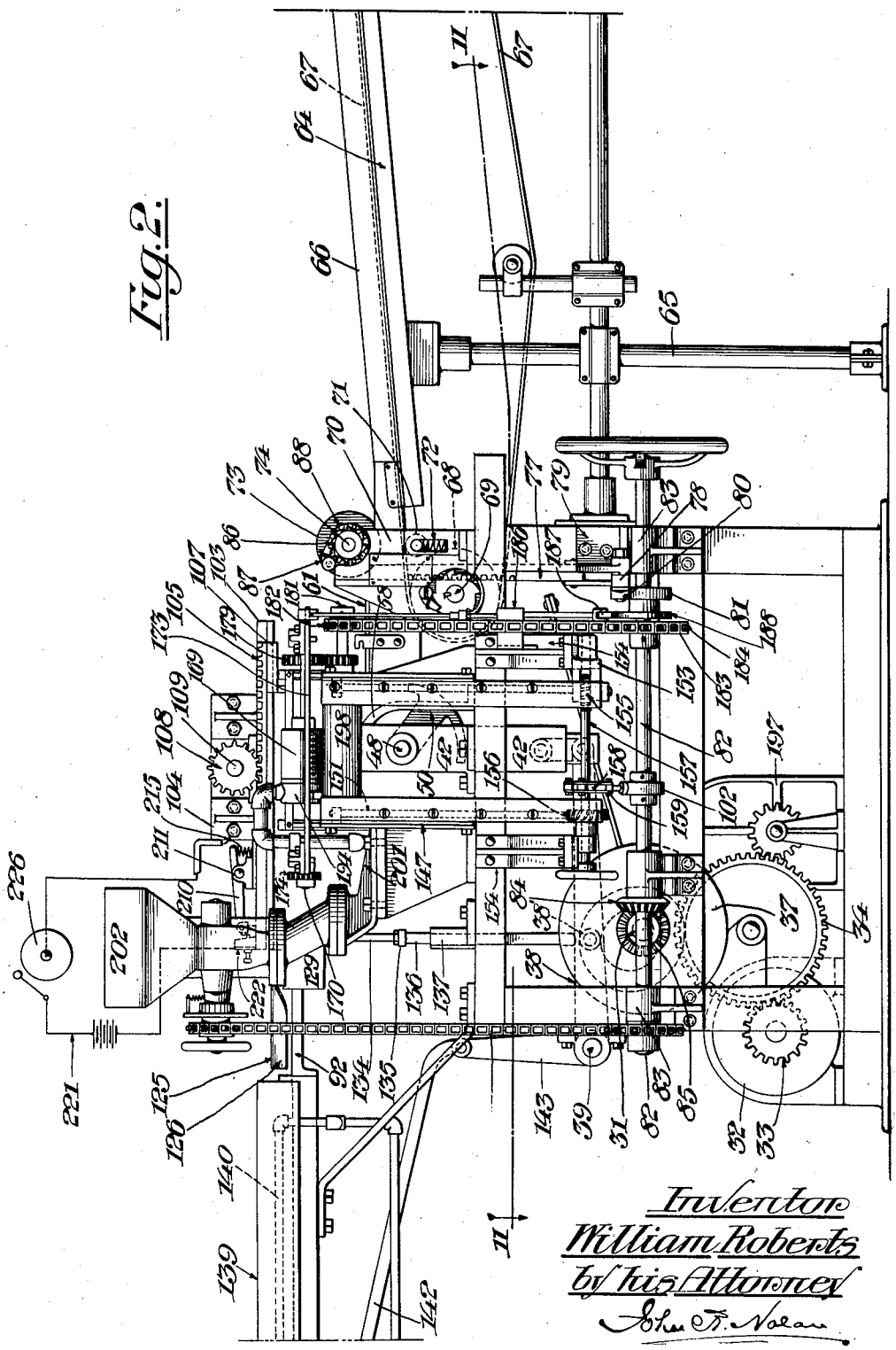

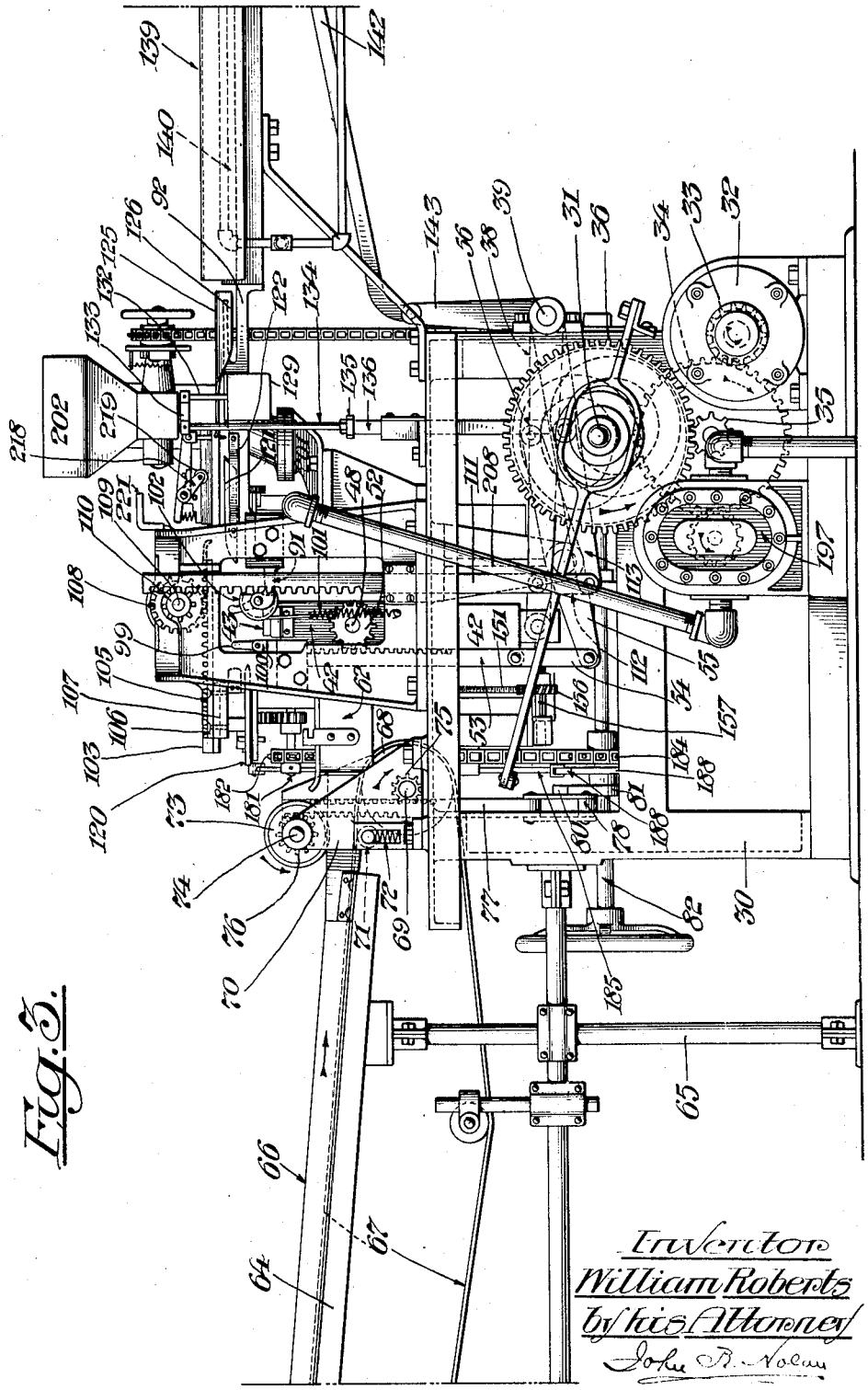

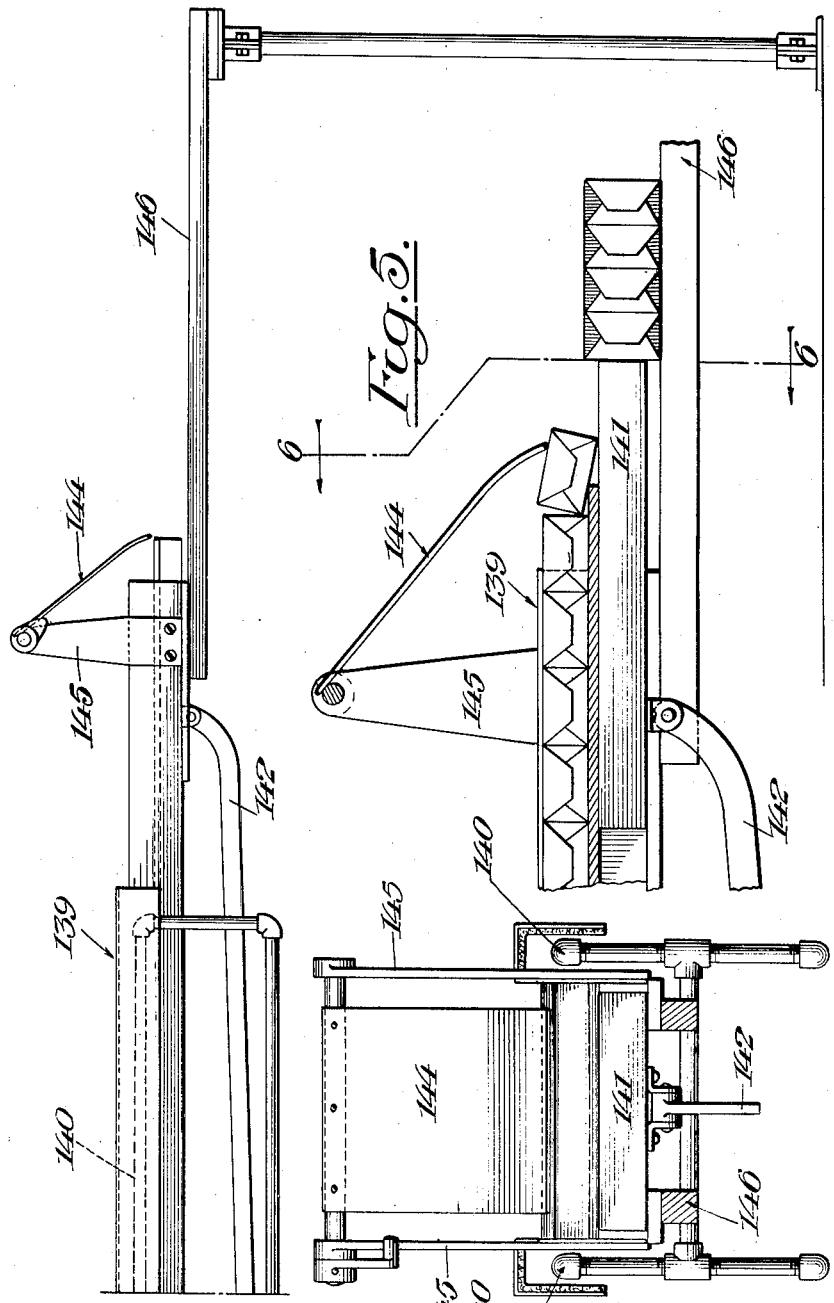

Inventor  
William Roberts  
by his Attorney  
John F. Nolan

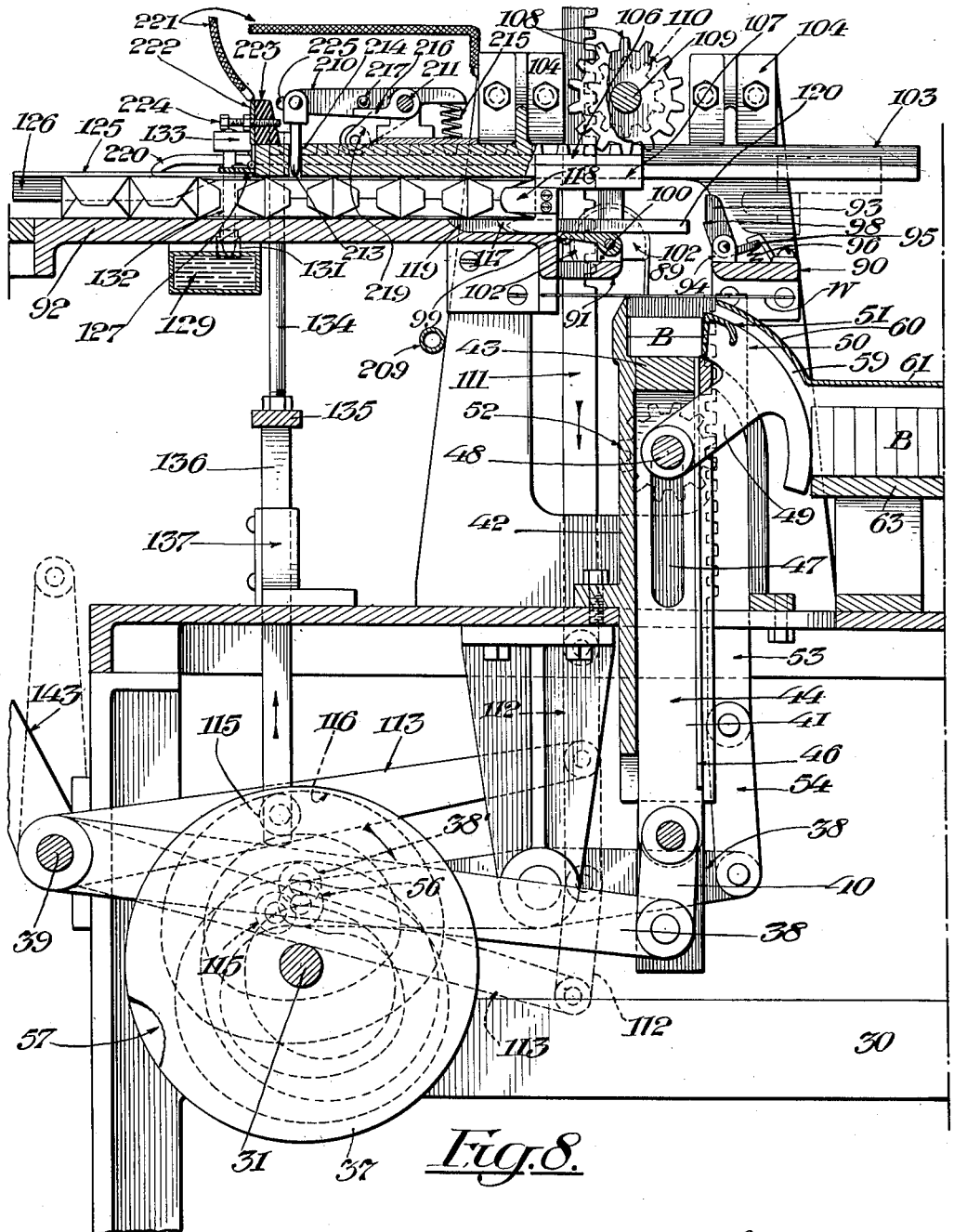

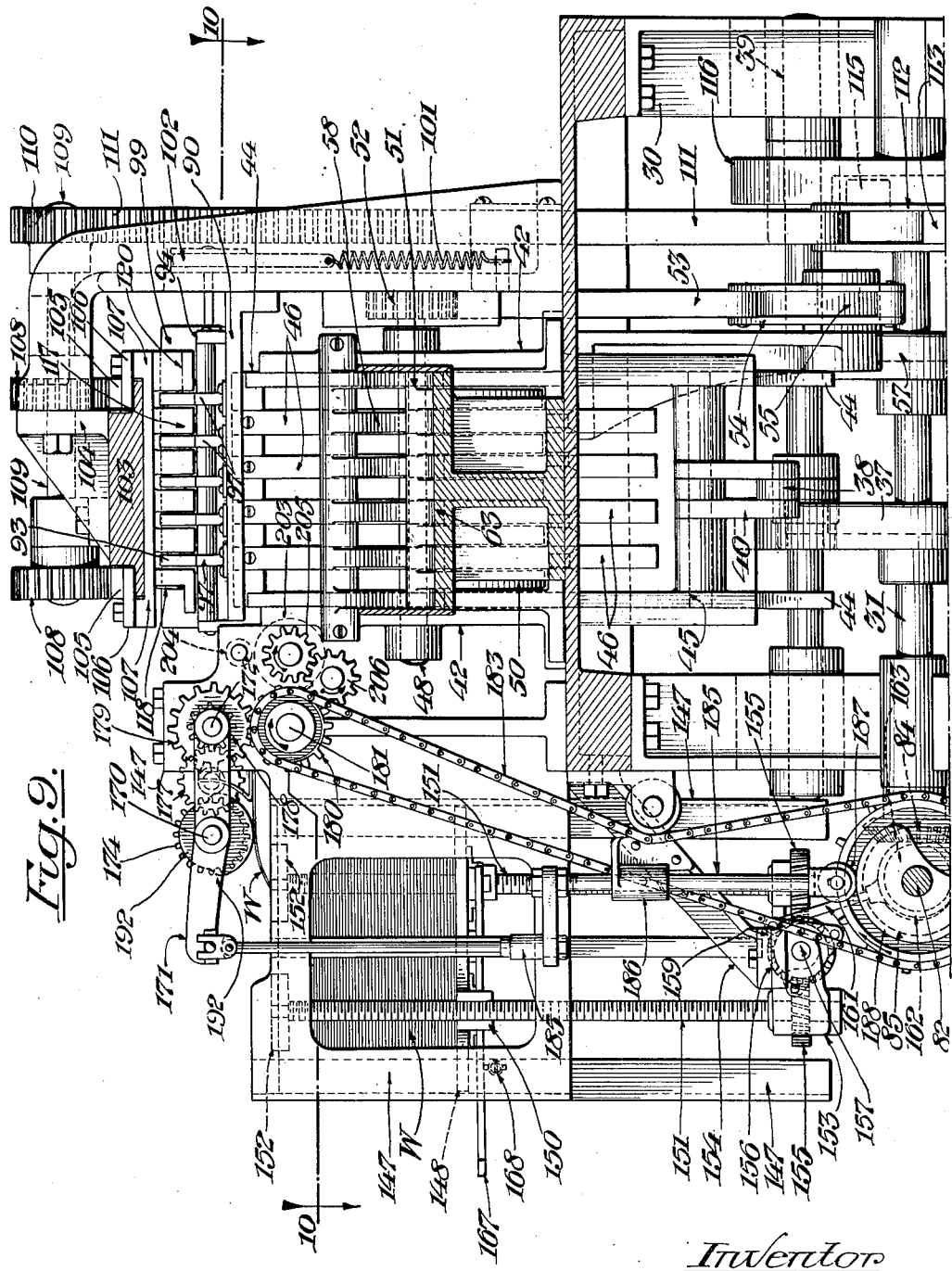

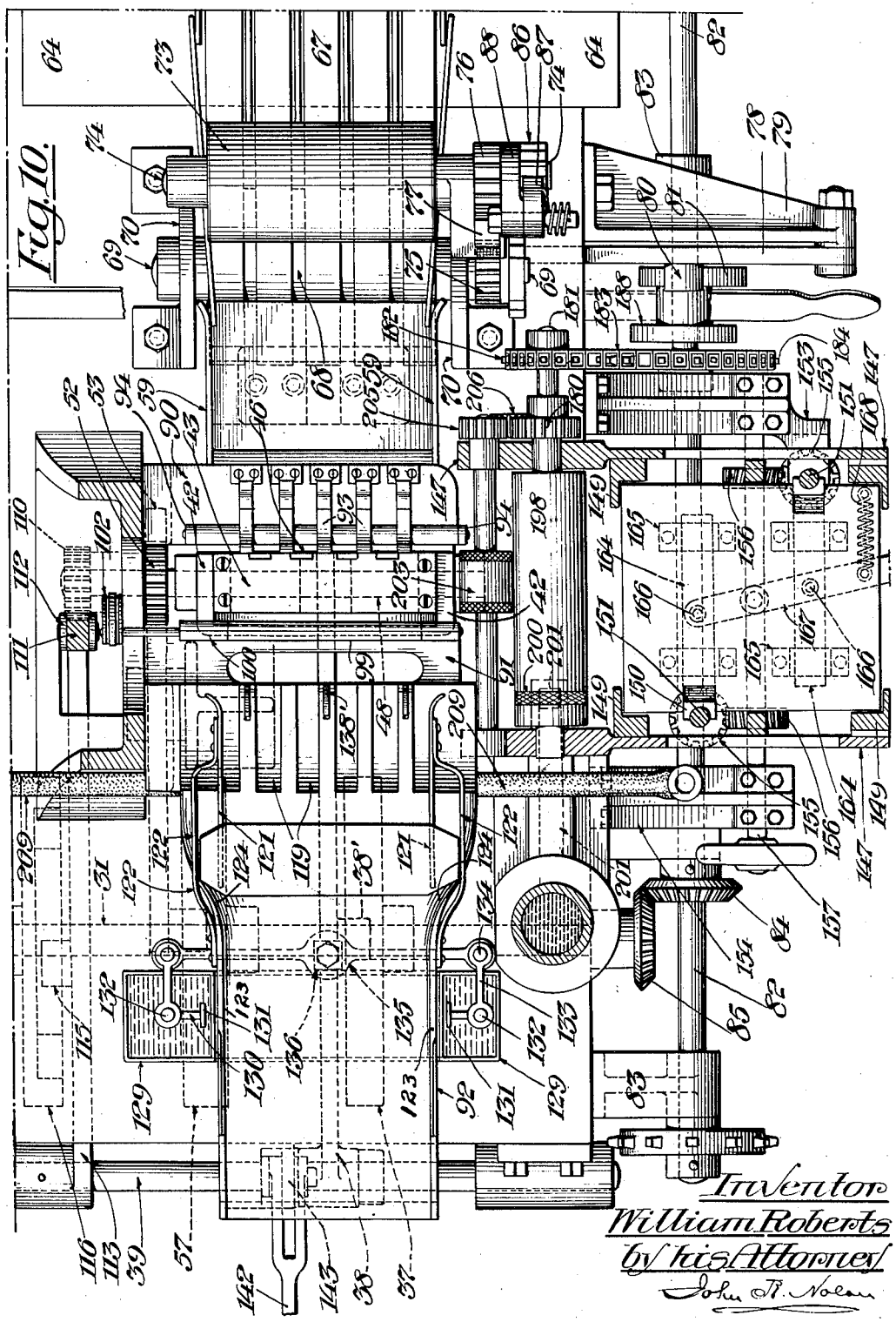

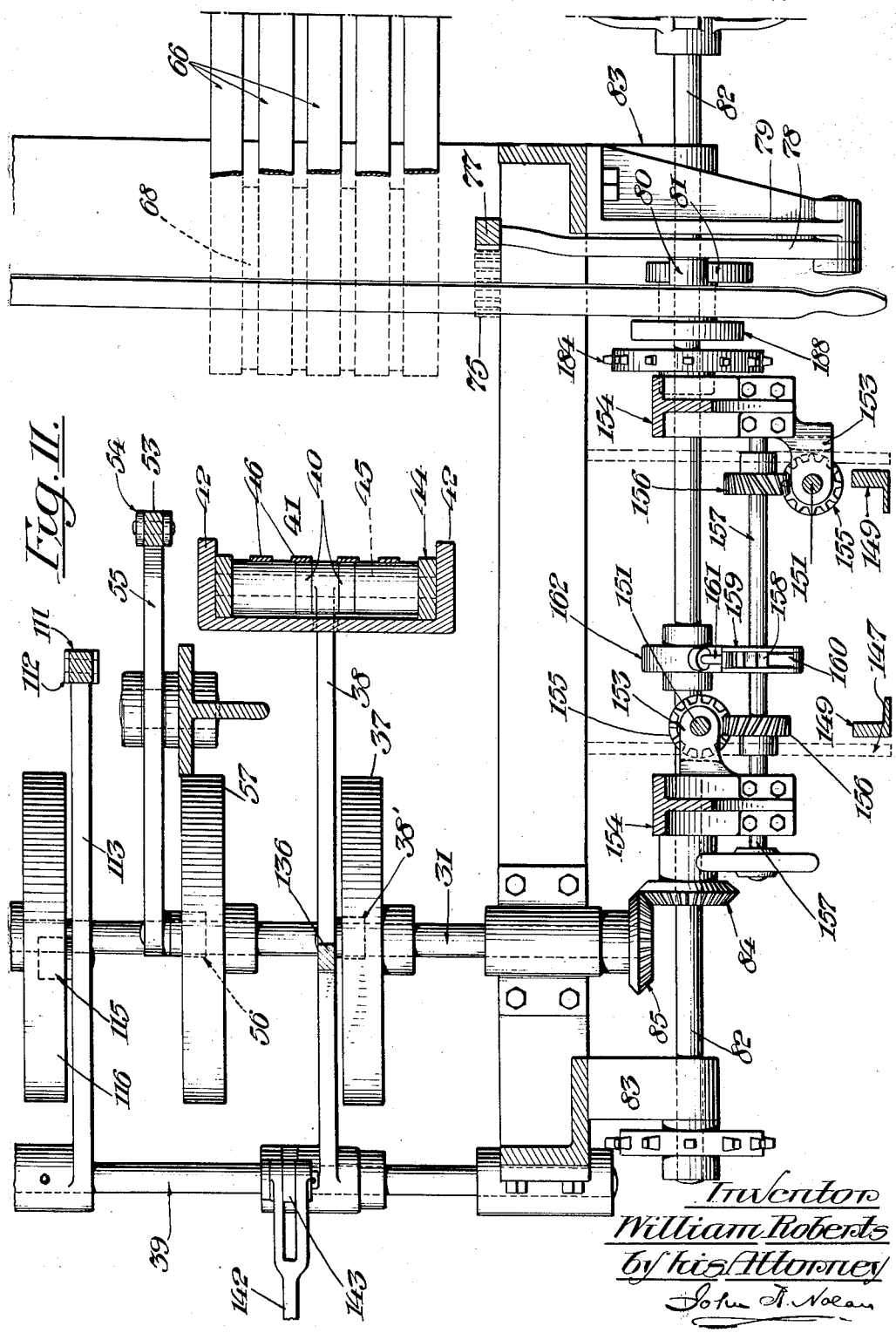

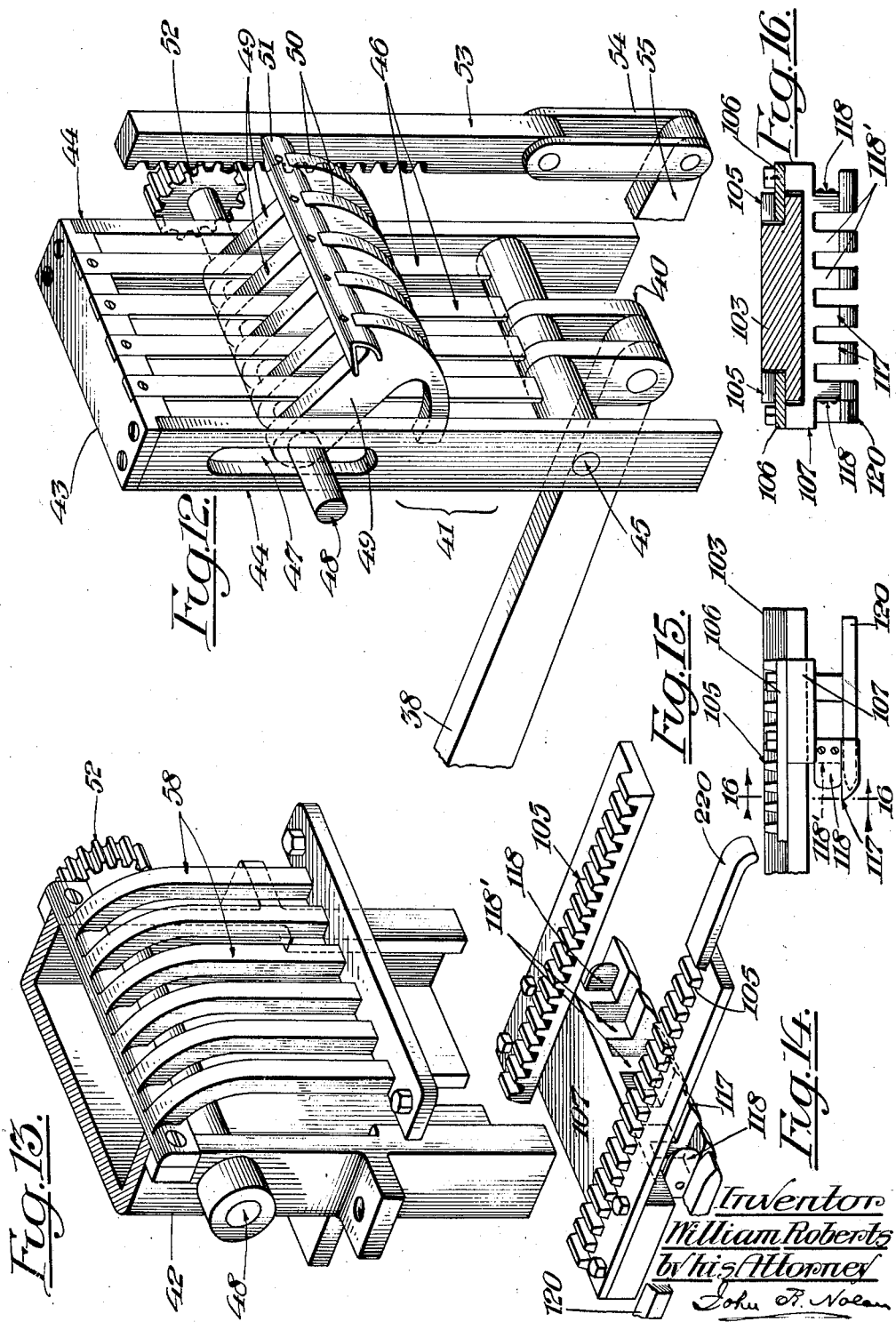

June 15, 1926. 1,589,229
W. ROBERTS
WRAPPING MACHINE
Filed May 6, 1924 13 Sheets-Sheet 11
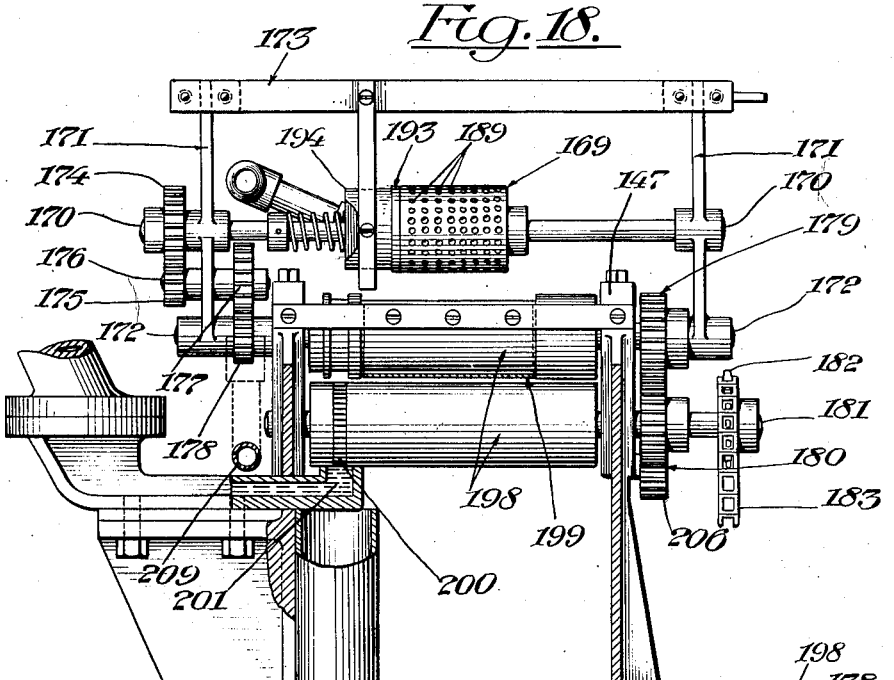
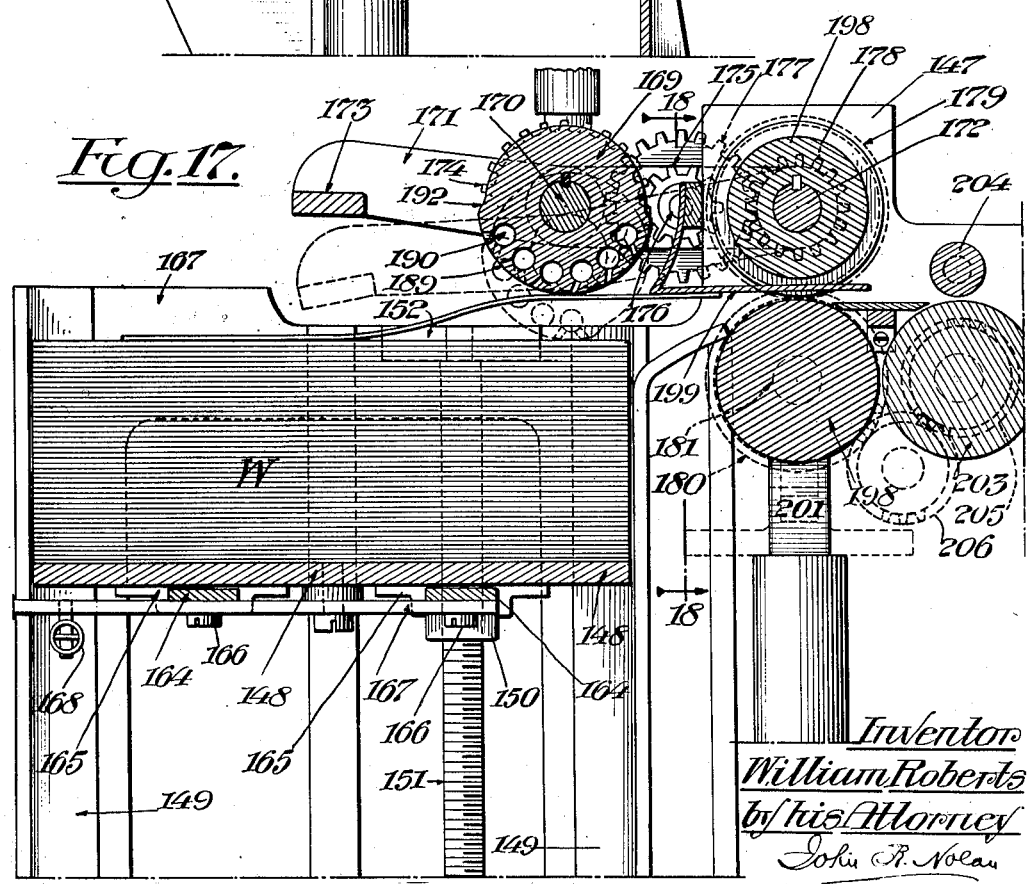
Inventor
William Roberts
by his Attorney
John R. Nolan

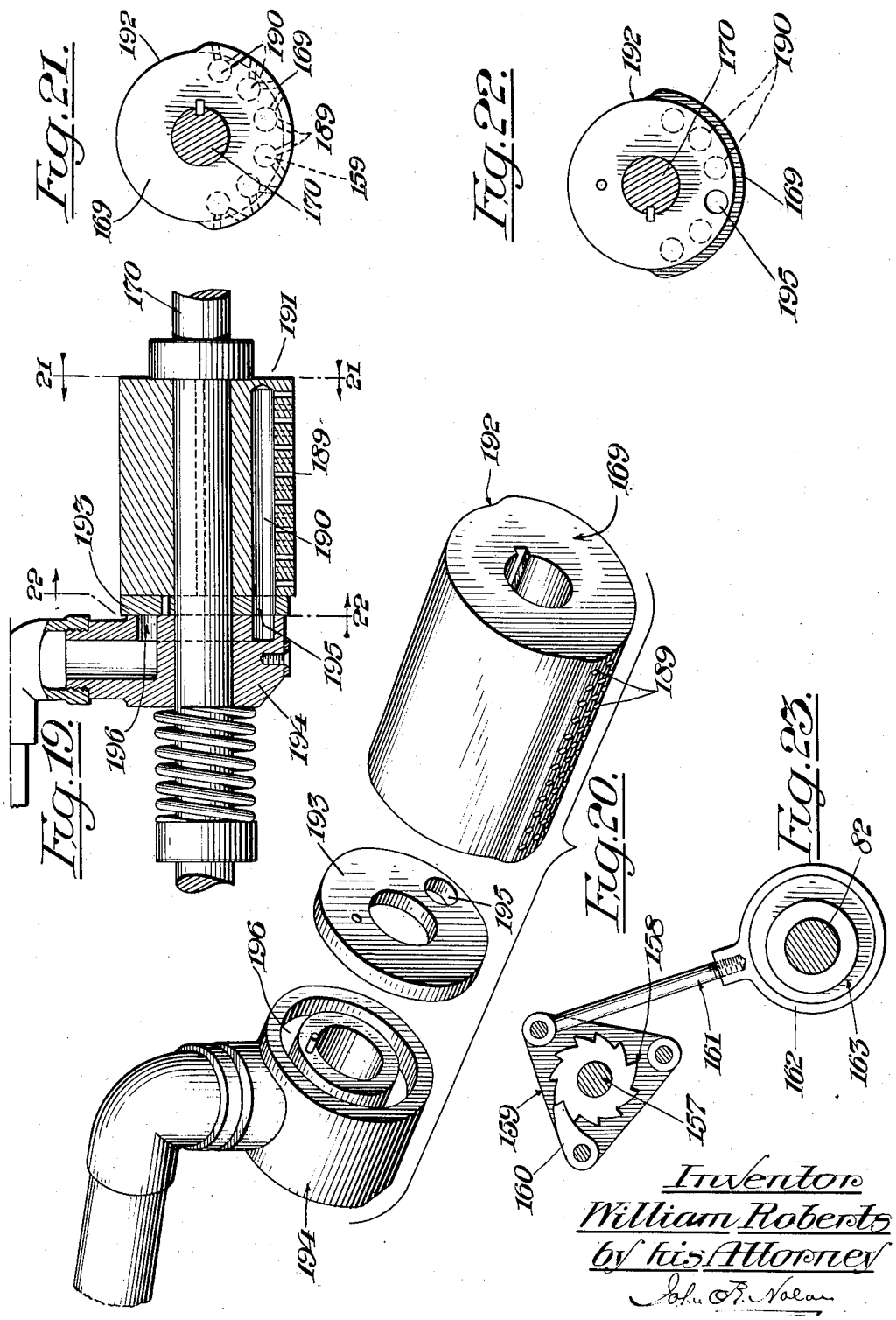

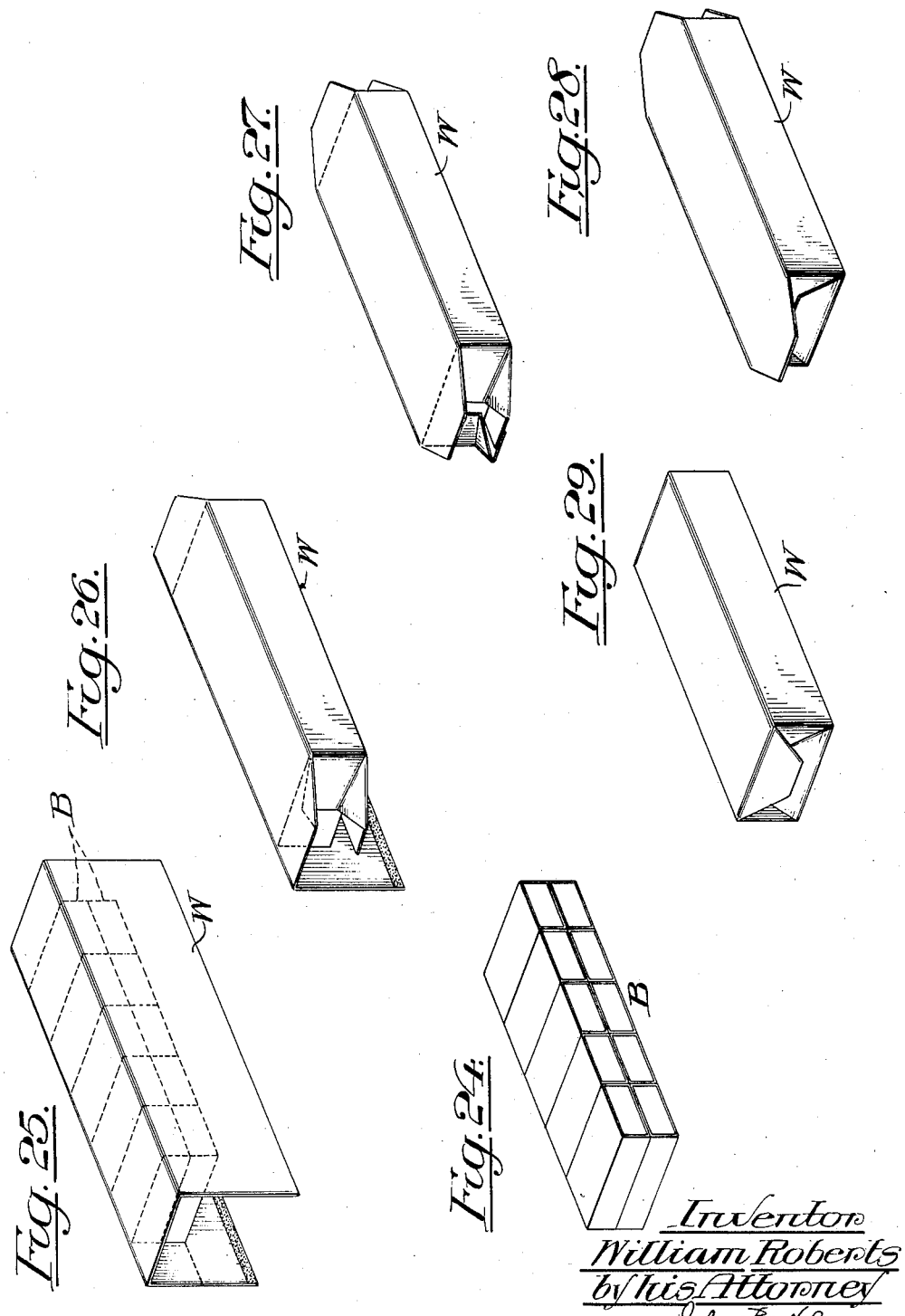

Patented June 15, 1926.

1,589,229

UNITED STATES PATENT OFFICE.

WILLIAM ROBERTS, OF SAVANNAH, GEORGIA, ASSIGNOR TO THE DIAMOND MATCH COMPANY, OF CHICAGO, ILLINOIS, A CORPORATION OF ILLINOIS.

WRAPPING MACHINE.

Application filed May 6, 1924. Serial No. 711,332.

This invention relates to package wrapping machines, having reference more especially to machines for wrapping groups of rectangular articles, such, for example, as boxes of matches and the like.

The present invention may be described as an improvement in the wrapping machine illustrated in Letters Patent of the United States No. 836,728, dated November 27, 1906, which machine comprises a reciprocative element operative to remove succeeding groups from a row or rows of articles and thrust each separated group against an overhanging wrapper and through a forming throat in such a manner that the wrapper is pressed about the group in a manner to cover the top and embrace the sides of the group; the dimensions of the wrapper being such that its ends and its side folds extend beyond and below the adjacent ends and sides respectively of the articles. Co-operatively arranged devices are provided whereby the depending portions of the side folds are folded successively against the under side of the articles and are secured together by an adhesive; whereby the projecting end flaps at the sides of the package are folded inwardly against the respective ends of the package, which flaps thus partially define the top and the bottom end flaps of the package; whereby the bottom end flaps are folded upward against the respective ends of the package; and whereby the top end flaps are finally folded against the respective ends of the package and are secured by an adhesive to the adjacent previously-folded end flaps, all as fully set out in said Letters Patent.

The main features of my present invention comprise mechanism for separating groups of articles from a row or rows and transferring them to the path of an elevating element included in the primary folding instrumentalities; mechanism for successively advancing the articles to the separating and transferring mechanism; mechanism for producing the respective bottom and end folds of the wrapper; and mechanisms for signaling or indicating the presence in the machine of an insufficient package; all said mechanism being so constructed and co-operatively arranged as to enable the rapid and economical production and delivery of properly wrapped packages of uniform shape and size, as will be hereinafter fully described. The scope of the invention will be defined in the appended claims.

In the drawings—

Figure 1 is a plan of a wrapping machine embodying my invention, the outer end portions of the article feeding and of the drying and delivery structures of the machine being omitted.

Figs. 2 and 3 are elevations of opposite sides of so much of the machine as is shown in Fig. 1.

Fig. 4 is a side elevation of the portion of the drying and delivery structure omitted from Fig. 3.

Fig. 5 is a longitudinal section, enlarged, of the package delivery end of the machine, showing the action of the discharge plunger upon the completed packages.

Fig. 6 is a transverse section through the delivery structure, as on the line 6—6 of Fig. 5.

Fig. 8 is a similar view, showing the transfer head as in its uppermost position and as having delivered the articles to the elevating plunger.

Fig. 9 is a transverse vertical section of the machine, as on the line 9—9 of Fig. 1.

Fig. 10 is a horizontal section of the same, as on the line 10—10 of Fig. 9.

Fig. 11 is a similar section, as on the line 11—11 of Fig. 2.

Fig. 12 is a perspective view of the elevating plunger, the associated transfer head, and adjuncts.

Fig. 13 is a similar view, partly in section, of the guide structure for the elevating plunger, showing the slotted or grate-like wall through which extend the arms of the transfer device.

Fig. 14 is a perspective view of the reciprocating folder carriage.

Fig. 15 is an elevation of the far side of a portion of the carriage shown in Fig. 14.

Fig. 16 is a transverse vertical section of the carriage, as on the line 16—16 of Fig. 15.

Fig. 17 is a vertical section, enlarged, of the wrapper supplying and forwarding mechanism, as on the line 17—17 of Fig. 1.

Fig. 18 is an elevation, partly in section, of the forwarding mechanism, showing the rock-frame, with the forwarding roll, raised, and also showing the devices for supplying paste to a margin of the wrapper, which section is generally on the line 18—18 of Fig. 17.

Fig. 19 is a longitudinal section of the pneumatic forwarding roll and its adjuncts.

Fig. 20 is a perspective view of the roll and its adjuncts separated.

Figure 7:
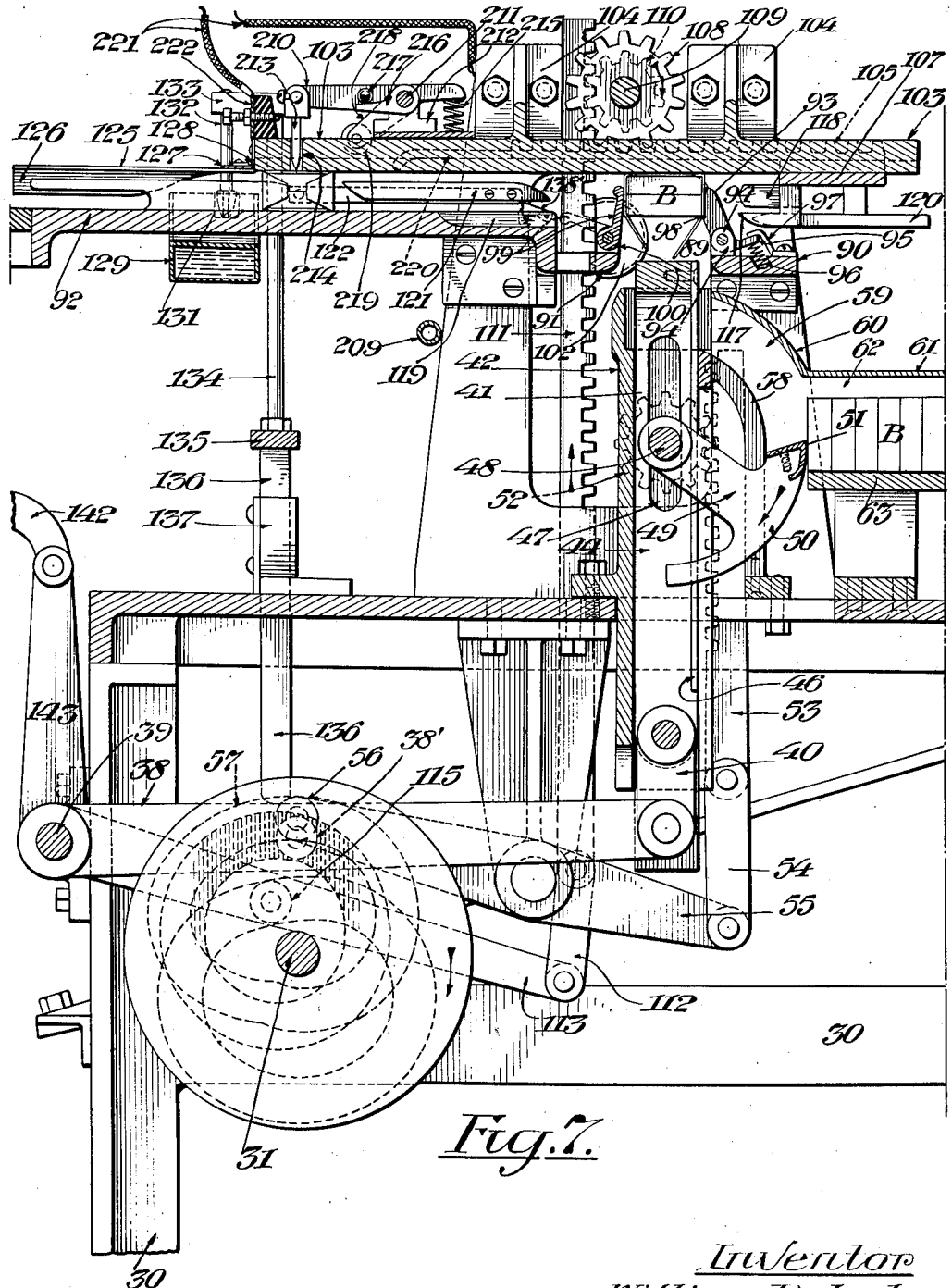
Fig. 7 is a longitudinal vertical section, enlarged, through the main part of the machine, as on the line 7—7 of Fig. 1, showing the relative positions of the parts while the oscillatory transfer head is approaching the limit of its down stroke preparatory to its receiving a prescribed number of the articles to be wrapped.

Figs. 21 and 22 are transverse sections through the roll shaft, as on the lines 21–21 and 22–22, respectively, of Fig. 19.

Fig. 23 is a detail, in sectional elevation, of the pawl and ratchet devices for intermittently actuating the mechanism for raising a stack of wrappers to the path of the forwarding roll.

Fig. 24 is a view of a group of boxes in condition to be wrapped.

Figs. 25 to 29, inclusive, illustrate the successive stages of wrapping the group of boxes.

Referring to the drawings, 30 designates a supporting frame of suitable shape and size for its intended purpose, and 31 designates the main shaft extending transversely of the machine and having its bearings in the frame. This shaft is driven from a suitable source of power, such, for example, as the adjacent electric motor 32, through suitable reducing gearing 33, 34, 35, 36. The gear 36 is mounted on the main shaft and can be rendered fast or loose thereon by means of a suitable clutch 36'. On the shaft 31 is fixed a cam 37 the race of which receives a roll 38' on a rock lever 38 which is fulcrumed at one end on a suitably disposed shaft 39 on the main frame. The other or free end of this lever is jointed by means of a link 40 to the lower end of a plunger 41 which is slidably mounted in a guide structure 42 bolted to the frame, and hence during the oscillation of the lever, through the agency of the cam, the plunger is vertically reciprocated. This plunger preferably comprises a horizontal top bar 43 and two spaced-apart depending bars 44 secured thereto, the lower portions of the latter bars being rigidly connected by a cross-rod 45 to which the link 40 is attached. On the front edge of the top bar are secured the upper ends of a series of spaced-apart depending slats 46, the function of which will presently appear. The side bars 44 are provided with vertical slots 47 through which freely extends a rock-shaft 48 having its bearings in the stationary guide structure 42. Fast on this rock-shaft, so as to turn therewith, is a transfer device comprising, preferably, a series of spaced-apart radial arms 49 terminating in segmental members 50, the upper portions whereof are connected by an angular strip 51 which constitutes a shelf. One end of the shaft 48 bears a pinion 52 in mesh with a vertically reciprocative rack 53, which is jointed at its lower end by means of a link 54 to one arm of a rock lever 55 the other arm whereof bears a roll 56 entered in the race of a cam 57 fast on the shaft 31. The cam 57 is in such timed relation to the cam 37 that the lever is oscillated and the rack reciprocated to effect the oscillation of the transfer device in harmony with the reciprocation of the plunger; so that articles imposed on the shelf 51 when it is in its down position can be swung upward thereby and deposited upon the top of the plunger when the latter is in its down position, as will be hereinafter described.

The shelf 51 is mounted to swing through an arcuate guide chamber, comprising a grate-like structure 58 located forwardly of the plunger, and affording suitable slots for the free passage of the arms 49 of the transfer device, and comprising also end walls 59 and an outer curved wall 60 concentric with and spaced from the inner wall constituted by the structure 58. The outer curved wall comprises an extension of the top or cover plate 61 of a rectangular inlet chamber 62, the bottom 63 of which is in or about the same horizontal plane as the top of the shelf 51 when the transfer device is in its down position. Hence articles, such as boxes B, can be advanced through the chamber and upon the shelf preparatory to the upward movement of the transfer device, which boxes when so advanced will be carried upward by the shelf through the arcuate guide chamber and deposited upon the top of the depressed plunger, as seen in Fig. 8.

It is to be noted that as the transfer device, with the group of boxes orderly disposed thereon, swings upward, the segmental portions 50 of the device pass across the throat of the inlet chamber adjacent the respective rows of boxes in the latter, and thus serve as a cut-off or closure for the chamber until the return of the device for a succeeding load of boxes. Further, that during the ascent and the descent of the plunger the spaced-apart slats 46 serve as a closure for the discharge opening of the arcuate guide chamber, and hence if defective boxes should happen to become jammed or clogged in the chamber their entry into the plunger will be prevented.

The means herein illustrated for delivering the boxes to the chamber 62 and advancing them upon the transfer shelf comprises a bed 64 supported by standards 65 and having on its upper surface a series of parallel longitudinally extending guide channels 66, each of which is adapted to be supplied with a row of boxes B resting on the bed. In the present instance there are five channels 66 which lead to the chamber 62, and hence five juxtadisposed rows of boxes can be simultaneously advanced into the chamber 62. The width of the shelf is such as to receive two boxes, side by side, from each row, and, therefore, when the transfer device ascends it separates the leading two boxes from each row. Hence the transfer device carries up ten boxes and, in its travel, swings the boxes through an arc of ninety degrees and delivers them flatwise (as indicated in Fig. 24) upon the top of the plunger in proper position for wrapping. (See Figs. 1, 7 and 8).

The rows of boxes are carried down the respective channels 66 by means of a series of endless belts 67 the upper runs of which underlie the respective channels and support the boxes. These belts pass around suitably-disposed pulleys at or adjacent the respective ends of the feed table. The inner pulley, indicated at 68, is borne by a shaft 69 having its bearings in standards 70 on the main frame. Adjacent this pulley 68 is a roller 71 the shaft of which is mounted in slotted bearings in the standards and is supported by suitable springs 72, which tend to press the roller 71 yieldingly against the bottoms of the upper runs of the belts. Overlying the feed table, directly above the roller 71, is a roller 73, the shaft 74 of which has its bearings in the standards 70. (See Figs. 1, 2 and 3).

The advancing boxes on the belt 67 are yieldingly held up against the roller 73 by the action of the spring pressed roller 71 on the underside of the upper runs of the belts, and hence when the roller 73 is properly rotated it co-operates with the belts to ensure the orderly advancement of the plural rows of boxes into the chamber 62. In the present instance the shafts 69, 74 are provided at one end with loosely mounted gear wheels 75, 76, respectively, which mesh with the oppositely disposed teeth of a vertically reciprocable rack-bar 77. The lower end of this bar is linked to one end of a rock-arm 78 which is pivoted at its opposite end to a bracket 79 on the main frame. This arm is provided with a lateral roll 80 which rests upon a cam 81 on a shaft 82 extending longitudinally of the machine and having its bearings in brackets 83 on the main frame. (See Figs. 2 and 10). The shaft 82 is driven from the shaft 31 by a pair of meshing bevel gear wheels 84, 85 fast on the respective shafts; thereby rotating the cam 81 and effecting the timed reciprocation of the rack bar 77.

During the reciprocation of the rack bar the two gear wheels 75, 76 are concurrently rotated in opposite directions to each other. Fast on each of the shafts 69, 74, adjacent the gear wheels, is a ratchet wheel 86 with the teeth of which engages a spring pressed pawl 87 pivoted to an arm 88 fast to the gear wheel, the pitch of the ratchet teeth being such that when the gear wheel is turned in one direction the motion is transmitted to the roller or pulley, but which gear wheel rotates idly when it is turned in the opposite direction. The roller and pulley are thus positively rotated in reverse directions to advance the interposed boxes into the chamber 62 and upon the transfer device, and are then caused to dwell until the transfer device returns to receive a fresh supply of boxes preparatory to their delivery to the field of action of the plunger.

When the plunger 41 is in down position a wrapper, W, having paste applied to one of its edges is positioned above the plane of the boxes on the plunger, so that when the plunger is raised the boxes are thrust against the wrapper and the latter is thereby forcibly elevated. Any suitable means for feeding the wrappers to the path of the boxes and for applying paste to the wrappers may be employed, the form of such means illustrated in the drawings being hereinafter described.

In the upward travel of the plunger the associated wrapper and boxes are forced through a throat 89 constituted by two spaced-apart cross-members 90, 91, the latter of which is formed at one end of a horizontal bed 92 supported by the main frame. The width and length of the throat are such as to permit the group of boxes to pass therethrough and coincidentally fold down the wrapper against the vertical sides of the boxes. The dimensions of the wrapper are such that its side folds depend below the boxes, and that such folds as well as the top fold extend beyond the ends of the boxes. (See Fig. 25).

Adjacent the respective sides of the throat 89 are upwardly extending resilient grippers which receive and support the partially wrapped package when it is forced through and above the throat, such grippers thus holding the top and sides of the wrapper firmly in place on the boxes. The forward gripper preferably comprises a series of fingers 93 independently pivoted on a shaft mounted in lugs 94 on the cross-member 90, each finger having a tail 95 which is yieldingly pressed upward by a spring 96 seated in a socket in the cross-member. An angular bracket 97 fixed to the cross-member and overhanging the tail affords a stop to limit the upward movement of the tail. The acting face of each finger 93 is formed with a suitably disposed shoulder 98 which takes under the lower lateral corner of the articles when they are fully elevated, and thus contributes to their efficient support. Preferably the fingers correspond in number with a row of boxes of the group, and are arranged to bear yieldingly against the wrapper in the planes of the respective boxes.

The rearward gripper preferably comprises a single plate 99 pivoted between lugs 100 on the cross-member 91, and held normally upward by the action of a spring 101 which is secured to one side of the frame and to a head 102 on the adjacent pivot shaft of the gripper. This gripper extends from end to end of the group of boxes, and its active face, which presses against the wrapper, is smooth. (See Figs. 7 to 10, inclusive.)

When the partially wrapped package is positioned between the grippers, the bottoms of the lower row of boxes are in the same plane, or substantially so, as the top of the bed 92. Overlying the package and the bed 92 is a cover plate 103 which is bolted to brackets 104 on the main frame, the space between the bed and the plate affording a trough or guide chamber into and through which the packages are advanced successively by reciprocative feeding and folding devices hereinafter explained.

The top of the plate is recessed along its longitudinal edges to provide guide channels in which are slidably mounted a pair of rack bars 105 having overhanging guide strips 106. The forward ends of these rack bars are rigidly connected by a cross-bar 107, the whole constituting a longitudinally reciprocative carriage. (See Figs. 9, 14, 15 and 16.) Meshing with the racks are suitably-spaced gear wheels 108 fixed on a transverse shaft 109 overlying the cover plate 103.

On one end of this shaft 109 is a gear wheel 110 with which meshes a vertically movable rack bar 111, whereof the lower end is jointed by means of a link 112 to one end of a rock-arm 113 fast on the rock-shaft 39. The rock arm 113 is provided with a lateral roll 115 which enters the race of a cam 116 fixed on the driven shaft 31, the contour of said race being such that at predetermined intervals the rock-arm is oscillated to effect the vertical reciprocation of the rack bar 111 and thereby effect through the gearing described the horizontal reciprocation of the carriage. (See Figs. 7 and 8.)

Depending from the cross-bar 107 are a series of spaced-apart angular members, whereof the lower horizontal portions 117 constitute folding fingers that extend rearwardly and have their upper surfaces on substantially the same horizontal plane as the bottom of the group of partially wrapped boxes supported by the grippers. These fingers 117 correspond in number with the spaces between the gripper members 93, and are so disposed that when the boxes are held by the co-acting grippers, the fingers 117 lie forwardly of and in line with the spaces between the members. Hence when the carriage is initially moved rearward, the fingers 117 pass through such spaces and impinge against the opposing depending flap of the wrapper and fold it up against the bottom of the group of boxes, (see Fig. 26), and as the carriage continues its travel the vertical portions 118' of the angular members bear against the opposing side of the partially folded package and force the latter bodily rearward in opposition to the pressure of the plate gripper 99. This gripper is thus swung rearwardly and downwardly as the package progresses. (See Fig. 8.)

In addition to the series of bottom folding members 117, the bar 107 is provided at its respective ends with rearwardly projecting fingers 118 which are positioned to bear against the opposing end projections of the wrapper and fold them inwardly against the boxes concurrently with the formation of the first bottom fold, when the carriage is initially moved rearward. In this way the end folds of the wrapper at one side of the group of boxes are formed, and at the same time the adjacent end projecting portions of the wrapper at the top and bottom of the package are bent or creased into flap form. (See Fig. 26).

During the continued rearward movement of the carriage the depending rear side flap of the wrapper (to the free longitudinal edge of which paste has been applied as will later appear) is folded up against the bottom of the group of boxes and also against the other bottom fold so as to overlap and adhere to the latter. Since the active face of the plate gripper 99 is smooth and uninterrupted throughout its length it acts with an ironing effect upon the contiguous bottom folds of the progressing package. Coincidentally with the folding of the rear side flap the partially wrapped package is pushed from the gripper 99 to and upon the top of the bed 92 and into engagement with devices which operate to complete the end folds of the wrapper, it being noted that the top of the bed is recessed, as at 119, to receive the bottom folders 117.

In order to maintain the gripper plate 99 in its down-turned position until the carriage has completed its rearward stroke and has returned to forward position with the bottom folding fingers forwardly of the series of grippers 93; one of the outer depending folding fingers is provided with a rearwardly extending cam bar 120 which is so located that in the rearward travel of the carriage (when the gripper plate has been swung downward by the advancing package), the bar passes upon said plate. (See Figs. 7 and 8.)

While the partially folded packages is being pushed along the bed by the depending angular members of the carriage, the end projections of the wrapper at the rearward or leading side of the package, encounter a pair of folding members 121 located at the respective sides of the bed, which members thus forcibly fold such wrapper projections against the respective ends of the group of boxes, and at the same time the adjacent end projections of the wrapper at the top and bottom of the wrapper are flexed into flap form. (Fig. 27).

In the present instance, each of the members 121 comprises a metal strip of substantial length rounded and outflared at its forward end, and supported by a spring arm 122 which is secured to a side flange 123 of the bed. Hence the members 121 bear yieldingly against the advancing end folds of the wrapper and press them yieldingly yet firmly against the opposing ends of the group of boxes. This done, the bottom end flaps, as the package progresses, encounter a pair of folding members 124 at the respective sides of the bed, and are thereby folded up against the opposing side end folds of the wrapper at the respective ends of the package. (Fig. 28). These members 124 are formed by the lateral flanges of the bed which extend forwardly and outwardly in a gradually turned or twisted direction into the paths of the advancing bottom flaps so as to receive such flaps and gradually cam them upwardly and against the ends of the package. (See Fig. 10).

The upper edges of the members 121 extend horizontally and are positioned to receive and support the outwardly projecting top flaps of the wrapper as the package progresses and as the bottom flaps are being folded. In the continued travel of the package the upper top flaps pass beneath a pair of horizontal plates 125 and encounter depending angularly formed folding flanges 126 on the respective plates. The plates are supported at one end, so as to overhang the path of the package, by means of a cross-bar 127 which is hinged to the rearward end of the cover plate, as at 128, whereby the said plates can be swung upward if and when it is desired to remove the packages for any reason.

Preparatory to the engagement of the top end flaps with the folding flanges 126, a spot of glue, or other adhesive, is applied to the underside of each of said flaps, so that when the flaps are folded down they are united to the contiguous bottom end flaps. (Fig. 29). In the present instance the glue-applying devices comprise two glue-containing pots 129 supported beneath the respective plates 125 and in advance of the folding flanges. Movable into and from the contents of the respective pots are two arms 130 having at their free ends angular upstanding portions 131 constituting pads effective to transfer spots of glue to the undersides of the respective overhanging end flaps of the wrapper. These arms are carried by rods 132 depending from arms 133 supported by a pair of rods 134 rising from the respective ends of a cross-bar 135. This cross-bar is fast on the upper end of a plunger 136 which is slidable in a guide fixture 137 on the main frame, the lower end of the plunger resting on the cam-operated rock-arm 38 with which the box supporting plunger 44 is connected. Hence during the impulses of the rock arm the plunger 136 and its appurtenances, including the pad bearing arms, are raised and lowered in a manner to apply spots of glue to the top end flaps of the wrapper. The plates 125 are preferably formed with apertures 138 in the vertical plane of the pads, so as to afford a yielding backing for the portions of the wrapper flaps to which the glue is applied by the pads. (See Figs. 1, 2, 3, 7, 8 and 10).

To obviate any liability of the retrograde movement of the packages during the retraction of the carriage, I preferably mount on the forward end of the bed a series of spaced-apart spring-pressed dogs or latches 138' which normally project above the upper surface of the bed. (See Figs. 7 and 10).

When the end folds of the package have been finally folded by their traverse against the flanges 126, the package passes into a suitable trough structure 139 equipped with heating devices, such as the circulating steam pipes 140, which structure thus constitutes a drying chamber which promotes the drying of the paste and glue on the wrapper and so ensures the efficient sealing of the package before its final discharge. It is to be understood, of course, that the packages are wrapped in succession and are thus advanced into and through the drying chamber.

Reciprocative longitudinally of and beneath and beyond the delivery end of the trough is a plunger 141, upon which the successive leading packages progress when the plunger is projected beyond the end of the trough, as illustrated in Fig. 5. The plunger is mounted in guides beneath the trough, and is connected by means of a link 142 to an up-standing arm 143 fast on the rock-shaft 39, whereby during the movements of said shaft through the co-operation of the rock-arm 113 and the cam 116, the plunger 141 is longitudinally reciprocated.

A swinging gravity gate 144, hung between a pair of standards 145 at the delivery end of the trough 139, bears against and upon each succeeding package as it is discharged from the trough and tips the package upon the projected plunger, so that when the plunger is retracted the package is swung downward in front of the plunger and placed with one of its long narrow sides upon an underlying pair of horizontal bars 146. Hence in the succeeding projection of the plunger the package is pushed rearwardly, and in consequence the succeeding packages are advanced along the tracks in close lateral relation to each other. (See Fig. 5.)

The means hereinbefore mentioned for supplying the wrappers and for applying paste thereto will now be described, reference being had to Figs. 1, 2, 3, 9, 10 and 17 to 23, inclusive, of the drawings. Suitably located at one side of the machine, and in proximity to the box elevating mechanism, are a pair of spaced apart frame cheeks 147 between which is mounted a vertically movable platform 148 adapted to support a stack of wrappers (W) with the uppermost wrapper in a horizontal plane just above that of the boxes imposed on the plunger 41 when the latter is in its down position. The platform is guided at its four corners by angular members 149 mounted on the frame cheeks, and is provided at its respective sides with nut sections 150 adapted to be engaged with vertical screw rods 151. (Figs. 9 and 10.) The upper ends of these rods have their bearings in brackets 152 on the respective cheeks, and the lower ends of the rods have their bearings in slotted boxes 153 supported by brackets 154 extending from the machine frame. The lower ends of the screw rods have fixed thereon angle gears 155 contained in the boxes 153, with which gears mesh a pair of similar gears 156 on a shaft 157 having its bearings also in the brackets 154, whereby when the shaft 157 is properly rotated the screw rods are actuated to effect the gradual elevation of the nut sections, and, perforce, the platform.

Fast on the shaft 157 is a ratchet wheel 158 adjacent to which is loosely mounted on the shaft a triangular member 159 to one corner of which is pivoted a pawl 160 that normally engages the teeth of the ratchet wheel. One of the other corners of the member 159 is connected by means of a rod 161 with the strap 162 of an eccentric 163 fast on the driven shaft 82, and in consequence the shaft 157 is intermittently rotated. The relation of the parts just mentioned is such that during each impulse of the shaft 157 the platform with its load is raised a distance equal to the thickness of a wrapper, which movement is effected immediately after the removal of each succeeding sheet from the top of the stack as hereinafter described.

In the present instance the nut sections 150 are carried by a pair of spaced parallel bars 164 slidably mounted in guides 165 on the underside of the platform, which bars are jointed as at 166 to the respective arms of a hand lever 167 that is fulcrumed on and projects forwardly of the platform. Suitably secured to the lever and to the platform is a spring 168 which tends normally to hold the lever in a position with the bars thrown in opposite directions and with their nut sections in engagement with the respective screw rods. By pulling the lever against the action of the spring the bars 164 are retracted to disengage their nut sections from the screw-rods, thus permitting the platform to be quickly lowered to any desired level preparatory to loading a stack of sheets thereon.

A forwarding roll 169 is mounted to overhang the stack of wrappers, the shaft 170 of said roll having its bearings in a pair of spaced apart rock-frame arms 171 which are hung on a shaft 172 journaled in suitably disposed bearings in the cheeks 147; the free ends of the arms being connected by a cross-bar 173. On one end of the roll shaft 170 is a gear wheel 174 which is geared with a gear 175 fast on the adjacent end of a stud shaft 176 journaled in the arms. The opposite end of the stud shaft bears a gear 177 in mesh with a gear 178 fast on one end of the shaft 172. Fixed on the opposite end of the shaft 172 is a gear 179 which meshes, in turn, with a gear 180 on a lower shaft 181. The shaft 181 bears a sprocket wheel 182 which is connected by means of a chain 183 with a sprocket wheel 184 on the driven shaft 82 hereinbefore referred to. By the gearing just described continuous motion is transmitted from the shaft 82 to the forwarding roll 169. (See Figs. 9, 17 and 18.)

One of the arms 171 is jointed to the upper end of a vertical bar structure 185 which is slidable in a bearing 186 on the adjacent bracket 154, the lower end of such structure having a roll 187 which rests upon a cam 188 fast on the shaft 82. The contour of this cam is in such timed relation to the eccentric 163 that during the period of rest after each elevation of the platform 148, the bar structure 185, together with the arms 171, is lowered and raised, thus moving the forwarding roll toward and from the uppermost sheet of the stack supported on the platform.

The forwarding roll, in its preferred form, comprises a generally cylindrical body having in a segment of its circumference a series of longitudinally extending rows of perforations 189, which open into a series of longitudinal ports 190 within the body and adjacent its periphery. These ports are closed at one end, as at 191, and are open at the opposite end of the roll. The imperforate circumference of the roll is slightly reduced, as at 192. (See Figs. 19 to 22, inclusive.)

A valve disk 193 fixed on a stationary exhaust head 194 contacts with the ported end of the roll, which disk is provided with a suitably disposed port 195 with which the succeeding ports 190 register during the rotation of the roll. The port 195 communicates with an annular chamber 196 formed in the exhaust head 194, which head is operatively connected with the suction port of an appropriate air exhausting pump 197 (Figs. 1 and 3), and hence as the ports 190 progressively register with the port 195 a partial vacuum is established within each succeeding port 190. These ports 190 are so located on the forwarding roll that when the latter is in its down position the leading perforations 189 advance into contactual relation with the uppermost sheet of the stack, thus resulting in the lifting of the sheet against the roll. Thereupon the rotating roll, together with the attached sheet, is raised, and as the succeding rows of perforations 189 progress with the roll the sheet is advanced into the bite of a pair of feed rolls 198 on the shafts 172, 181, respectively. These feed rolls operate to move the sheet toward and above the box supporting plunger 41. As the rotation of the pneumatic forwarding roll continues it is lowered to a position with its reduced periphery in proximity to the stack, so that when the first row of perforations 189 again reaches the succeeding uppermost sheet the latter will be picked up and forwarded as in the previous instance; and so on. If desired the forwarding roll may be intermittently instead of continuously rotated. A suitably-disposed guide 199, which directs the succeeding sheets to the bite of the feed rolls, is supported on the framework so as to extend beneath a peripherally reduced portion of the upper feed roll 198.

The lower feed roll 198 is provided near one end thereof with a peripheral portion 200 to which paste is delivered from the delivery duct 201 of an elevated paste-containing hopper 202 (Figs. 1 and 2) and hence as the sheet is advanced between the feed rolls a marginal line of paste is applied to the under-surface of the sheet by the portion 200. The sheet passes from the feed rolls between a pair of guide rollers 203, 204 and thence to its position above the plunger 41. The shafts of the rollers 203, 204 are mounted in journals in the frame cheeks, the shaft of the roller 203 having a gear 205 meshing with an idler 206 which, in turn, meshes with and is driven by the gear 180 on the shaft 181 of the lower feed roll 198.

In the present instance the connection between the pump 197 and the exhaust head 194 for the forwarding roll comprises a stationary pipe connection 208 extending from the pump, and a flexible pipe connection 209 between the pipe 208 and the exhaust head so that the rock frame 171 can be oscillated. The flexible pipe connection is preferably detachably coupled to the exhaust head, in order that it can be readily removed from the head if it be desired to raise the rock-frame and its appurtenances for cleaning or other purposes.

In order to signal or indicate to the attendant the presence in the machine of a package containing less than the prescribed number of boxes, if such condition should occur from, say, a misfeed of the boxes to the transfer device, mechanism of the following description is provided, reference being had to Figs. 1, 3, 7, 8 and 14 of the drawings. A series of equally spaced parallel levers 210 are loosely mounted on a transverse rock shaft 211 journaled in a supporting bracket 212 extending transversely of the cover plate 103. These levers, which extend longitudinally of the machine, correspond in number with, and are in the same vertical planes as the paths traversed by, a properly assembled row of boxes contained in a partially wrapped package supported on the bed 92. Since, in the present instance, each row consists of ten boxes, there are provided ten levers 210. Jointed on the longer arm of each of the levers is a pin 213 which depends loosely into an aperture 214 in the cover plate and, by actuation of the lever, is movable into and from the path of the package. A spring 215 acting on the shorter arm of the lever tends normally to raise such arm and thus depress the pin through the aperture. Fast on the shaft 211 adjacent each of the levers is a toe 216 upon which bears a laterally projecting stud 217 on the longer arm of the lever, and hence by turning the shaft in one direction the longer arms of the series of levers and therewith the pins will be raised against the action of the springs, and by turning the shaft in the opposite direction the levers will be released and their longer arms, including the pins, will be depressed by the action of the springs 215.

Fast on one end of the shaft 211 is a downwardly inclined arm 218 having at its free end a roll 219 which lies in the path of a cam plate 220 (Fig. 14) on one of the rack bars 105, so that as the carriage approaches the limit of its rearward stroke the cam plate rides under the roll and lifts the arm in a manner to move the shaft and raise the toes 216, which toes, in turn, by their contact with the studs 217, raise the longer arms of the levers 210 together with the pins 213 to such an extent that the latter are above the path of the packages. In the next succeeding stroke of the carriage the cam plate 220 escapes the roll 219, thus freeing the action of the toes on the studs 217 and permitting the springs 215 to effect the depression of the longer arms of the levers and their pins 213. The co-operative relation of the package feeding mechanism is such that a package is advanced to a position directly beneath the up-raised pins during each rearward stroke of the carriage, which package there remains until the succeeding rearward stroke of the carriage when the package is pushed therewith and its place beneath the pins is occupied by a succeeding package; and so on.

While a package is at rest beneath the pins 213, the latter, when they are released during the forward stroke of the carriage, bear yieldingly upon the top of the wrapper, and if such wrapper be supported by the contents of the package it will sustain the pins against the force of the springs 215. If, however, a box be lacking, the portion of the wrapper above the vacancy will be penetrated by the overlying pin and the lever carrying such pin will be forced down by the spring.

The levers 210 are included in a normally-open electric circuit, the leads of which are indicated at 221. One of these leads is connected to a bus bar 222 supported on an insulating block 223 mounted on the cover plate 103 adjacent the free ends of the longer arms of the levers, and the other lead is grounded to the main frame. Extending through the bus bar and the insulating block are a series of contact screws 224 corresponding in number and spaced relation with the levers; the adjacent ends of which latter are provided with contacts 225 any of which, by actuation of its lever, is movable into and out of contact with the proximate screw 224 so as to make and break the electric circuit respectively. Included in the circuit is a suitable alarm, such as the electric bell 226. (Fig. 2).

From the foregoing it will be seen that when any pin 213 penetrates the wrapper as previously mentioned, the electric circuit will be completed and an alarm be automatically sounded. In that case the defective package can be readily removed by swinging up the hinged plates 125 as previously explained.

It is to be understood that my invention is not limited to the specific construction herein described, as the mechanisms may be variously modified within the principle of the invention and the scope of the appended claims.

I claim—

1. In a wrapping machine, the combination with wrapper folding mechanism, an article elevating element reciprocative toward and from said mechanism, and means for feeding wrappers into the path of the said element and below the folding mechanism, of means for supporting and feeding a row of articles in a path below the level of the folding mechanism, a transfer device movable to and above the delivery portion of said feeding and supporting means and operative to receive a prescribed number of the leading articles and carry them upward to and deposit them upon the elevating element, and mechanism for operating said element and transfer device in timed relation to each other.

2. In a wrapping machine, the combination with wrapper folding mechanism, an article elevating element reciprocative toward and from said mechanism, and means for feeding wrappers into the poth of the said element and below the folding mechanism, of means for supporting and feeding a row of articles in a path below the level of the folding mechanism, an oscillatory transfer device, including a shelf, movable to and above the delivery portion of said feeding and supporting means and operative to receive a prescribed number of the leading articles and carry them upward to and deposit them upon the elevating element, and mechanism for operating said element and transfer device in timed relation to each other.

3. In a wrapping machine, the combination with wrapper folding mechanism, an article elevating element reciprocative toward and from said mechanism, and means for feeding wrappers into the path of the said element and below the folding mechanism, of means for supporting and feeding a row of articles in a path below the level of the folding mechanism, an oscillatory transfer device including a series of radial arms having segmental portions at their outer ends movable across the delivery portion of said feeding and supporting means, said segmental portions having a shelf thereon operative to receive a prescribed number of the leading articles and carry them upward to and deposit them upon the elevating element, and mechanism for operating said element and transfer device in time relation to each other.

4. In a wrapping machine, the combination with wrapper folding mechanism, an article elevating element reciprocative toward and from said mechanism, and means for feeding wrappers into the path of the said element and below the folding mechanism, of means for supporting and feeding a row of articles in a path below the level of the folding mechanism, a guide chamber leading from the delivery portion of the said feeding and supporting means to the path of the elevating element, an oscillatory transfer device movable within said chamber and operative to receive a prescribed number of articles and carry them upward to and deposit them upon the elevating element, and mechanism for operating said element and transfer device in timed relation to each other.

5. In a wrapping machine, the combination with wrapper folding mechanism, an article elevating element reciprocative toward and from said mechanism, said element comprising an open frame structure having spaced-apart slats on its front side, and means for feeding wrappers into the path of the said element, of means for supporting and feeding a row of articles in a path below the level of the folding mechanism, a guide chamber leading from the delivery portion of the said feeding and supporting means to the path of the elevating element, an oscillatory transfer device movable within said chamber and operative to receive a prescribed number of articles and carry them upward to and deposit them upon the elevating element, and mechanism for operating said element and transfer device in timed relation to each other.

6. In a wrapping machine, the combination with wrapper folding mechanism, an article elevating element reciprocative toward and from said mechanism, said element comprising an open frame structure having spaced-apart slats on its front side, and means for feeding wrappers into the path of the said element, of means for supporting and feeding a row of articles in a path below the level of the folding mechanism, a guide chamber leading from the delivery portion of the said feeding and supporting means to the path of the elevating element, one wall of said chamber comprising a slotted or grate-like structure, an oscillatory transfer device, including a series of radial arms extending through the slots of said structure and having a shelf member movable across the said delivery portion and operative to receive a prescribed number of the leading articles and carry them upward to and deposit them upon the elevating element, and mechanism for operating said element and transfer device in timed relation to each other.

7. In a wrapping machine, the combination of a bed having a passage through which the articles to be wrapped can be passed, means for feeding a wrapper beneath said passage, means for forcing the articles and wrapper through said passage so as partially to fold the wrapper, a carriage reciprocative longitudinally of the bed and having bottom and end folding members, said carriage including gear racks, pinions in mesh with said racks, a shaft for said pinions, and means for rotating said pinions in timed relation to the operation of the means for forcing the articles and wrapper through the said passage.

8. In a wrapping machine, the combination with a bed having a passage through which the articles to be wrapped can be passed, means for feeding a wrapper beneath said passage, means for forcing the articles and wrapper through said passage so as partially to fold the wrapper, a series of resilient package holding fingers mounted at one side of the passage; a resilient gripping and ironing plate mounted at the opposite side of the passage, and means for forcing the elevated package and its partially folded wrapper against and across the said plate, thereby swinging said plate to a horizontal position.

9. In a wrapping machine, the combination with a bed having a passage through which the articles to be wrapped can be passed, means for feeding a wrapper beneath said passage, means for forcing the articles and wrapper through said passage so as partially to fold the wrapper, a series of resilient package holding fingers mounted at one side of the passage, a resilient gripping and ironing plate mounted at the opposite side of the passage, and means for forcing the elevated package and its partially folded wrapper against and across the said plate, thereby swinging said plate to a horizontal position, said last-named means including a member co-operating with the said plate to hold the plate temporarily in horizontal position.

10. In a wrapping machine, the combination of a bed along which a package having outwardly-projecting end flaps can be forced, apertured supporting members for the tops of the outwardly-projecting flaps, and glue-applying devices movable toward and from the apertures of the supporting members so as to spot the flaps underlying said apertures, and means for thereafter folding said flaps against the respective ends of the package.

11. In a wrapping machine, a trough structure into which the packages are forced, a swinging gate member overhanging the delivery end of said structure, a longitudinal plunger reciprocative beneath and beyond said delivery end, and a package support arranged below and extending beyond the path of the plunger.

12. In a wrapping machine, the combination with a supporting element for progressing packages, each containing a row of articles, of wrapper penetrating means including a series of puncturing devices overlying the path of each succeeding package and corresponding in number with a prescribed row of articles in the package, means tending to press the said devices upon the wrapper of the package, means for raising said devices and maintaining them raised during the travel of the packages and for releasing them when a package is positioned thereunder, a signal device, and connections whereby the said device is actuated in the event of any of the said device or devices, when released, penetrating a part of the wrapper spanning an unfilled space in a package.

13. In a wrapping machine, the combination with a supporting element for progressing packages, each containing a row of articles, of a wrapper penetrating means including a series of puncturing devices overlying the path of each succeeding package and corresponding in number with a prescribed row of articles in the package, means for raising the said devices and maintaining them raised during the travel of the packages and for releasing them when a package is positioned thereunder, a normally-open electric circuit including a signal device and contact connections whereby the electric circuit is completed in the event of any of the said device or devices, when released, penetrating a part of the wrapper spanning an unfilled space in the package.

14. In a wrapping machine, the combination with a supporting element for progressing packages, each package containing a row of articles, of a series of levers overlying the path of each succeeding package and corresponding in number with a row of articles in the package, depending pins on the corresponding arms of the respective levers, springs acting on the levers and tending to maintain the pins depressed upon the wrapper of the package, means for holding the levers with the pins elevated in opposition to the action of the springs, a normally-open electric circuit including a signal device and contact connections for the respective levers, whereby the electric circuit is completed in the event of any pin or pins, when released, penetrating a part of the wrapper spanning an unfilled space in the package.

15. In a wrapping machine, the combination with a package supporting element, means for intermittently advancing a succession of packages along the same, each package containing a row of articles, of wrapper penetrating means including a series of pressure pins overlying the path of each succeeding package and corresponding in number with a prescribed row of articles in the package, means tending to press the pins upon the wrapper of the package, means under the control of the package-advancing means and operative to raise the pins and maintain them raised during the travel of the package and for releasing them when a package is at rest thereunder, a signal device, and connections whereby the said device is actuated in the event of any pin or pins, when released, penetrating a part of the wrapper spanning an unfilled space in the package.

Signed at Savannah in the county of Chatham and State of Georgia this 2 day of May A. D. 1924.

WILLIAM ROBERTS.